United States Patent [19]

Distaso

[11] Patent Number: 5,817,612

[45] Date of Patent: *Oct. 6, 1998

[54] AQUEOUS BENZYL FORMATE PAINT STRIPPER

[75] Inventor: John Distaso, Orange, Calif.

[73] Assignee: Elf Atochem North America, Inc., Philadelphia, Pa.

[*] Notice: The term of this patent shall not extend beyond the expiration date of Pat. No. 5,405,548.

[21] Appl. No.: 772,375

[22] Filed: Dec. 23, 1996

Related U.S. Application Data

[63] Continuation of Ser. No. 452,247, May 26, 1996, abandoned, which is a continuation of Ser. No. 314,040, Sep. 28, 1994, abandoned, which is a division of Ser. No. 92,046, Jul. 15, 1993, abandoned, which is a continuation-in-part of Ser. No. 32,824, Mar. 17, 1993, abandoned, which is a continuation of Ser. No. 777,865, Oct. 16, 1991, abandoned, which is a continuation-in-part of Ser. No. 647,860, Jan. 30, 1991, abandoned.

[51] Int. Cl.$^6$ .............................. C09D 9/00; C09D 9/04
[52] U.S. Cl. .......................... 510/203; 510/206; 510/488
[58] Field of Search .................................. 510/203, 206, 510/488, 407, 201

[56] References Cited

U.S. PATENT DOCUMENTS

| | | | |
|---|---|---|---|
| 1,169,783 | 2/1916 | Ellis | 252/DIG. 8 |
| 2,737,465 | 3/1956 | Pessel | 134/38 |
| 3,150,048 | 9/1964 | Hollub et al. | 252/DIG. 8 |
| 3,391,085 | 7/1968 | Crockett | 252/143 |
| 4,448,713 | 5/1984 | Boden | 252/174.11 |
| 4,732,695 | 3/1988 | Francisco | 252/162 |
| 4,780,235 | 10/1988 | Jackson | 252/170 |
| 4,812,255 | 3/1989 | Suwala | 252/142 |
| 5,454,985 | 10/1995 | Harbin | 252/173 |

FOREIGN PATENT DOCUMENTS

| | | |
|---|---|---|
| 256084 | 11/1988 | Czech Rep. . |
| 0 160 762 | 11/1985 | European Pat. Off. . |
| 3438399 | 4/1986 | Germany . |
| 3913911 | 11/1990 | Germany . |
| A 60-124661 | 7/1985 | Japan . |
| 1602187 | 11/1981 | United Kingdom . |

OTHER PUBLICATIONS

Kumar "Application of the Singh–Jha Equation in the Evaluation of b* of the Laidler–Landskroenor Equation", React. Kinet. Catal. Lett. 33(1) pp. 229–232 (1987) (no month).

Apelblat et al "Excess Gibbs Energy of (formic acid & benzyl alcohol) . . . " J. Chem. Thermodynamics 16, pp. 891–895 (no month), 1984.

Ullmanns Enzyklopadie, 1974, Germany, p. 371.

Gibson–formic Acid, 1969, US, 673–691.

Kailan & Adler, 1933 Germany, 155–185.

Werner 1980 Germany p. 196 no month available.

Turco 6776 1989 US 2 pgs. Product Material Safety Data Sheet No Month Available.

German Industrial Standard 52900 1988 Germany 4 pgs. No Month Available.

*Primary Examiner*—Mark Kopec

[57] ABSTRACT

Aqueous paint stripper formulations containing a solvent system comprised of an ester such as benzyl formate and methods for using the same to strip paint.

5 Claims, No Drawings

AQUEOUS BENZYL FORMATE PAINT STRIPPER

CROSS-REFERENCE TO RELATED APPLICATIONS

This is a continuation of application Ser. No 08/452,247, filed on May 26, 1995, now abandoned, which is a continuation of 08/314,040, filed Sep. 28, 1994 (abandoned), which is a division of 08/092,046, filed Jul. 15, 1993 (abandoned), which is a cip of 08/032,824, filed Mar. 17, 1993 (abandoned), which is a continuation of 07/777,865, filed Oct. 16, 1991 (abandoned), which is a cip of 07/647,860, filed Jan. 30, 1991 (abandoned).

FIELD OF THE INVENTION

This invention relates to compositions for paint removal without the use of chlorinated solvents such as methylene chloride, especially paint stripper formulations containing a benzyl ester such as benzyl formate.

BACKGROUND

Health and environmental concerns are causing the limiting and/or obsoleting of the use of the heretofore classic thixotropic paint strippers based upon chlorinated solvents. However, solvent-based strippers employing solvents other than chlorinated materials have thus far not been wholly successful in removing today's paint/primer films (e.g., polyurethane, epoxy, and alkyd paints). Further, the preferred ester solvent of this invention (benzyl formate) would have heretofore been considered too expensive to warrant consideration as a replacement for chlorinated solvents.

SUMMARY OF THE INVENTION

A paint stripper formulation is provided (together with its use for stripping paint) containing (a) a solvent system (typically about 25 to 88 parts by weight) based on an ester having the formula HC(O)OR, where R is selected from benzyl and methylbenzyl, preferably a system containing the ester together with an alcohol of the formula ROH and formic acid in which latter event there is typically about 1 to 10 parts (preferably about 2 to 5 parts) each of the acid and the ester for each 5 parts of the alcohol, and (b) water (typically about 5 to 75 parts by weight). R is preferably benzyl. In order to make the use of the preferred benzyl formate ester economically attractive, the ester is preferably formed in situ from the corresponding (benzyl) alcohol and (formic) acid.

Depending on the intended end-use, the formulations normally also contain other conventional additives such thickeners, dispersants, surfactants, and/or corrosion inhibitors.

DETAILED DESCRIPTION OF INVENTION

It has now been found that the expensive benzyl formate ester is formed when the corresponding relatively inexpensive benzyl alcohol is reacted with formic acid. Further, it has been found that the reaction solution containing the formate, alcohol, and acid is a superior solvent to either the alcohol or the formate alone. Optimum results occur when the amount (by weight) of alcohol exceeds that of the ester and when the formulation contains at least about 30 percent by weight of water. Before adding water to the formulation, premixing of the other ingredients is desirable to allow the alcohol, acid, and ester to reach equilibrium conditions. The equilibrium conditions untimately reached by the alcohol, acid, water and ester will, of course, be the same whether one starts with the equilibrium mixture itself or with equivalent amounts of the starting materials as illustrated in the examples. In contrast to the foregoing, when acetic acid was substituted for formic acid, an ester could not be formed unless the reaction was driven with a catalyst. Further, as shown below, the subject benzyl formate/-benzyl alcohol/ formic acid formulations were found to strip polyurethane and epoxy paint systems more than three times as fast as equivalent benzyl acetate/benzyl alcohol/acetic acid formulations.

Other suitable esters are those derived by starting with methylbenzyl alcohol instead of benzyl alcohol, including all four methylbenzyl isomers (alpha, ortho, meta, and para).

Conventional additives added to the formulations include one or more of the following: thickeners (such as hydroxypropyl methyl cellulose, hydroxyethyl cellulose or xanthan gum); dispersants (or solubilization agents) such as propylene glycol, sodium polymethacrylate (available from W. R. Grace under the tradename "Daxad 30"), or sodium xylene sulfonate; surfactants such as the amphoteric surfactants (e.g., imidazolines) or ethoxylated nonylphenol (available from G.A.F. under the tradename Igepal CO-630"); corrosion inhibitors such as 2-mercaptobenzotriazole or toluene triazole; and mineral oil (to prevent evaporation). For viscous (vertical cling-type) strippers applied by spraying or brushing, up to about 75% water may be present (percent by weight, based on the weight of the total composition), while thin (immersion tank type) strippers may have up to about 50% water. The water is preferably deionized.

Typical compositions would be comprised of about 25 to 88 parts by weight of the solvent system, 0 to 4 parts thickeners, 0 to 15 parts dispersants, 0 to 9 parts surfactants, 0 to 4 parts corrosion inhibitors, 0 to 22 parts mineral oil, and from about 5 to about 75 parts water (preferably about 30–50 parts for faster stripping). Examples of useful compositions of this invention (Example Nos. 1–4) are presented below (all parts being by weight), along with a comparative example (Nos. C1) with acetic acid and benzyl acetate in place of formic acid and benzyl formate:

| Ingredient | Parts Added | Parts At Equilibrium |
| --- | --- | --- |
| Example 1. Cling-Type Stripper: | | |
| benzyl alcohol | 35.0 | 25.0 |
| formic acid | 11.0 | 7.0 |
| hydroxypropyl methyl cellulose ("HMC") | 0.8 | 0.8 |
| propylene glycol ("PG") | 3.0 | 3.0 |
| 2-mercaptobenzothiazole ("2MBT") | 0.7 | 0.7 |
| Daxad 30 | 2.0 | 2.0 |
| deionized water | 47.5 | 49.0 |
| benzyl formate | 0.0 | 12.5 |
| Example 2. Cling-Type Stripper with Less Water: | | |
| benzyl alcohol | 35.0 | 21.2 |
| formic acid | 11.0 | 4.9 |
| HMC | 0.8 | 0.8 |
| PG | 3.0 | 3.0 |
| 2MBT | 0.7 | 0.7 |
| Daxad 30 | 2.0 | 2.0 |
| deionized water | 24.0 | 26.5 |
| benzyl formate | 0.0 | 17.4 |

| Ingredient | Parts Added | Parts at Equilibrium |
| --- | --- | --- |
| Example 3. No Added Water: | | |
| benzyl alcohol | 35.0 | 14.2 |
| (90%) formic acid | 12.0 | 1.9 |
| HMC | 0.8 | 0.8 |
| PG | 3.0 | 3.0 |
| 2MBT | 0.7 | 0.7 |
| Daxad 30 (none added since no water to disperse) | 0.0 | 0.0 |
| deionized water | 0.0 | 4.7 |
| benzyl formate | 0.0 | 26.2 |
| Comparative C1. Benzyl Acetate/ Acetic Acid: acetic acid (in place of formic acid) | | 7.0 |
| benzyl acetate (in place of benzyl formate) (remainder of formula identical to Example 1 formula) | | 12.5 |
| Example 4. Immersion-Type Stripper: | | |
| benzyl alcohol | 18.0 | 10.6 |
| benzyl formate | 0.0 | 9.3 |
| formic acid | 13.0 | 9.9 |
| water | 47.5 | 48.7 |
| sodium xylene sulfonate | 11.0 | 11.0 |
| 2MBT | 0.5 | 0.5 |
| mineral oil | 10.0 | 10.0 |

Comparative stripping tests were run on the invention formulations of Examples 1–3 and on the Comparative formulation C1 following MIL-R-81294D (except that 3×6 inch aluminum clad panels were used instead of 6×15 inch panels), a military specification used to evaluate the effectiveness of paint strippers to remove a white polyurethane paint and a gray epoxy paint (typical of what is in use by the Air Force and Navy) from aluminum. The first of these tests compared Example 1 to Comparative C1 since the formulations are identical except that C1 uses acetic acid and benzyl acetate in place of the formic acid and the benzyl formate of the invention Example 1 formulation. The average times to completely strip the polyurethane and epoxy paints are set forth in Table I below, the averages being obtained by running 5 sections, throwing out the high and low times, and averaging the remaining 3 times (in the case of the use of C1 to strip the epoxy, however, one section only 85% stripped was considered to be 100% stripped in order to give a third data point for averaging purposes):

TABLE I

| | Time to Strip: | |
| --- | --- | --- |
| | Polyurethane Paint | Epoxy Paint |
| Example 1 | 135 minutes | 109 minutes |
| Comp. C1 | did not strip in 8 hours | 360 minutes |

A second test following the same procedure compared invention Examples 1–3 to demonstrate that adding water has a beneficial effect on stripping. Results showed that Example 1 gave slightly faster stripping times than Example 2 with both epoxy and polyurethane, while Example 3, though clearly superior to C1, was nearly twice as slow in stripping epoxy and did a less thorough stripping of the polyurethane.

What is claimed is:

1. An aqueous paint stripper formulation containing, at equilibrium, (a) from about 25 to about 88 parts by weight, based on the weight of the formulation, of a solvent system comprising benzyl formate, benzyl alcohol, and formic acid, and (b) water.

2. The formulation of claim 1 wherein at least a portion of the benzyl formate and water have been formed in situ from benzyl alcohol and formic acid.

3. The formulation of claim 1 wherein at least a portion of the benzyl alcohol and formic acid have been formed in situ from benzyl formate and water.

4. The formulation of claim 1 where the weight % of benzyl alcohol exceeds the weight % of benzyl formate.

5. An aqueous paint stripper formulation containing, at equilibrium, (a) from about 25 to about 45 parts by weight, based on the weight of the fornulation, of a solvent system comprising benzyl formatc, benzyl alcohol, and formic acid, and (b) water.

* * * * *